United States Patent [19]

Williams

[11] 4,185,186
[45] Jan. 22, 1980

[54] METHOD OF CONSTRUCTING AN ELECTRICAL RADIANT HEATING SYSTEM

[76] Inventor: Chester I. Williams, 347 Greenbriar, SE., Grand Rapids, Mich. 49506

[21] Appl. No.: 858,845

[22] Filed: Dec. 8, 1977

[51] Int. Cl.² ............................................. H05B 1/00
[52] U.S. Cl. .................................................... 219/213
[58] Field of Search ............................... 219/213, 345; 174/DIG. 8, 94 R, 90

[56] References Cited

U.S. PATENT DOCUMENTS

| | | | |
|---|---|---|---|
| 2,997,568 | 8/1961 | Leipold et al. | 219/213 |
| 3,138,656 | 6/1964 | Merrell | 174/90 |
| 3,451,609 | 6/1969 | Gillett | 174/DIG. 8 |
| 3,904,847 | 9/1975 | Adams | 219/213 |
| 4,057,187 | 11/1977 | Cranston et al. | 174/94 R |

FOREIGN PATENT DOCUMENTS

| | | | |
|---|---|---|---|
| 263110 | 10/1967 | Austria | 174/84 R |
| 1565202 | 2/1970 | Fed. Rep. of Germany | 219/213 |
| 907609 | 7/1945 | France | 219/213 |
| 109848 | 7/1925 | Switzerland | 219/213 |
| 864656 | 4/1961 | United Kingdom | 219/213 |

OTHER PUBLICATIONS

Heating Cable Installation, "Electrical Construction and Maintenance", May 1968, pp. 178, 181, 185.

Primary Examiner—C. L. Albritton
Attorney, Agent, or Firm—Glenn B. Morse

[57] ABSTRACT

A grid of insulated electrical resistors is incorporated in a floor structure in a novel construction procedure involving poured concrete. Coaxial connections are made between resistor elements by welding exposed ends, and insulating the ends adjacent the weld with heat-shrinkable tubes slipped over at least one of the resistor-conductors prior to the welding.

1 Claim, 15 Drawing Figures

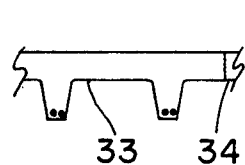
FIG.-2
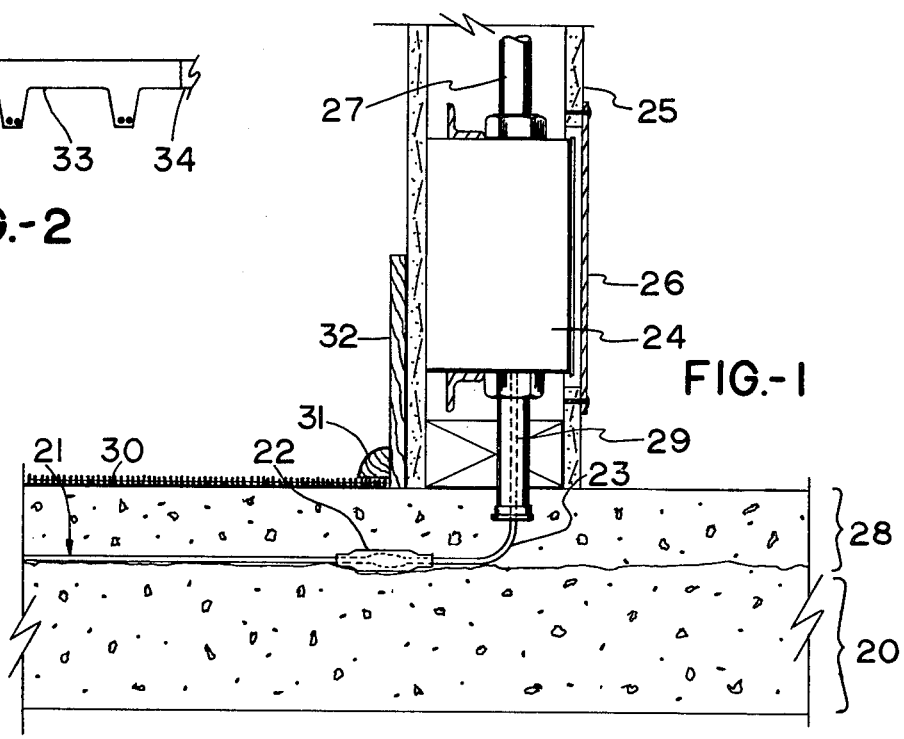
FIG.-1
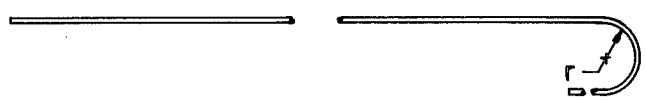
FIG.-3
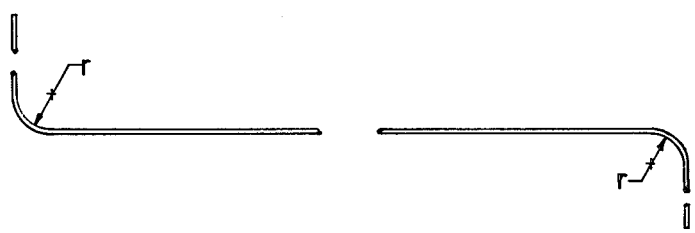
FIG.-4
FIG.-5

METHOD OF CONSTRUCTING AN ELECTRICAL RADIANT HEATING SYSTEM

BACKGROUND OF THE INVENTION

Electrical radiant heating systems have become increasingly popular because of the high efficiency of the utilization of the electrical energy. One of the most effective forms of this system is the incorporation of a grid of electrical resistance-conductors in the floor structure of a room so that the entire floor becomes a radiant heating panel. The maintenance of this large surface at a temperature very slightly in excess of the personal comfort level will provide uniform heat with a minimum loss of heat to the surrounding structure from conduction and convection. Heating a room by warming the air tends to produce a stratification of the air in which much of the heat accumulates near the ceiling. The result is a relatively cold floor, and a substantial heat loss through the ceiling structure, in addition to the necessity of maintaining a somewhat higher air temperature than is necessary for personal comfort. The apparent room temperature is considerably less than the maximum at the upper levels of the room.

The low temperature requirements of the electrical resistance system associated with a radiant floor permits the use of common insulating materials, and eliminates the fire hazard that would be associated with glowing resistor elements commonly associated with electric hot-air systems.

The apparent simplicity of a floor installation of resistor elements is, however, somewhat deceptive. Experience with this type of system has established that continuous sealed insulation must be maintained between the various portions of the resistor system in order to prevent short circuits from the presence of moisture, or from contact with foreign materials or conductive structural members. This is particularly the case when an attempt is made to incorporate the grid system in concrete floor construction. The arrangement shown in my previous U.S. Pat. No. 3,223,825, issued on Dec. 14, 1965, had many desirable functional characteristics, but experience with this system disclosed the need for a number of improvements. The present system provides these improvements, and establishes an integrated system that can be installed through routine procedures by workmen of ordinary skill, with the performance being predictable and relatively maintenance-free.

SUMMARY OF THE INVENTION

The preferred procedure for constructing a radiant floor system involves the construction of a sub-floor capable of carrying the necessary floor loading in the particular installation. This sub-floor can be produced either as a reinforced poured concrete slab, or by a group of continuous T beams of precast reinforced concrete laid so that the top surface of the flanges is in coplanar relationship. Floors of both types are standard. With the sub-floor in position, the insulated heating elements are laid directly on the exposed sub-floor surface, and the elements are connected to form a complete electrical system through a procedure involving the stripping of the primary insulation of the connectors near the adjacent coaxial ends, followed by slipping a heat-shrinkable tube of insulating material over one or both of these ends, and then welding or brazing the exposed portions of the conductors together. This is followed by slipping the insulating tubes back over the exposed portions of the conductors (including the weld) and heat-shrinking the tubes down to form a continuous sealed insulation system extending from the primary insulation of one conductor over to another. The heat-shrunk tube overlaps the ends of the primary insulation of both conductors, and the heat-shrinking procedure forms an effective seal at these points. After the connections have been made, and connecting portions have been provided extending vertically upward from the floor level, or to another position clear of the final floor surface, a thin layer of concrete or other such material is poured over the entire grid system, leaving the end connections protruding for subsequent connection to an appropriate conduit.

DESCRIPTION OF THE DRAWINGS

FIG. 1 is a sectional elevation showing a portion of a floor system incorporating an electrical grid for radiant heating, shown at a junction of the floor with a partition.

FIG. 2 is a sectional elevation showing a type of sub-floor construction involving groups of precast double T beams.

FIG. 3 is an elevation showing a portion of one form of conductor.

FIG. 4 is a plan view showing an end curvature suitable for a typical resistor component.

FIG. 5 illustrates another common form of resistor component that can be installed as a section of any particular system.

DESCRIPTION OF THE PREFERRED EMBODIMENTS

Figure 6:
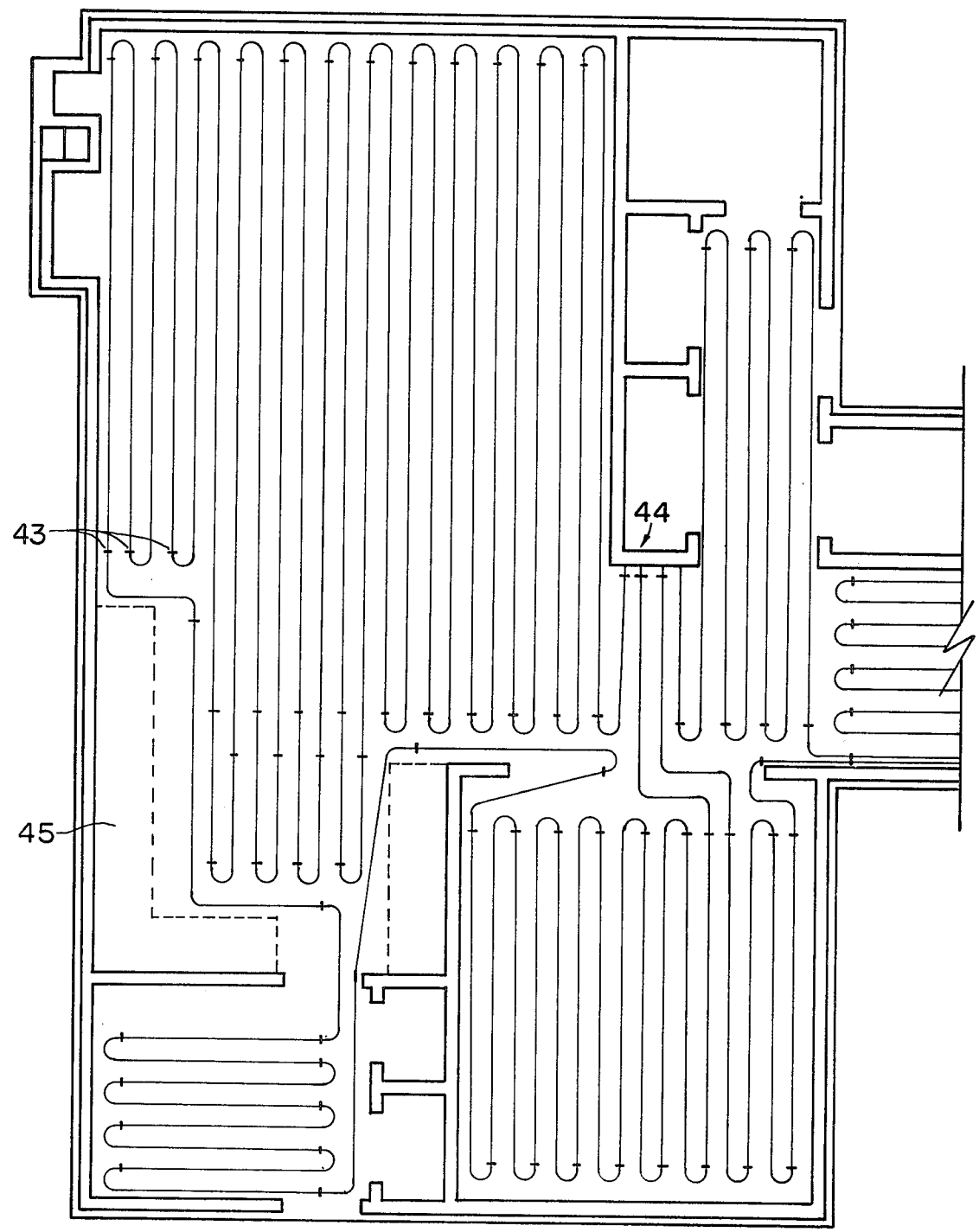
FIG. 6 is a schematic plan view showing a portion of a resistor grid incorporated in a particular room arrangement.

Referring to FIG. 1, the radiant heating floor construction includes the sub-floor 20 prepared in the usual manner as a reinforced concrete slab. The electrical grid system indicated generally at 21 is made up of a number of components of the type shown in FIGS. 3–5 and 10–15, with insulated connections as shown at 22. Final connecting portions as indicated at 23 are provided extending upward from the top of the sub-floor 20 to a position where they become available for connection to other conductors in the junction box 24 installed in the partition 25, and covered with the access plate 26, which can be removed for service and inspection. A primary electrical conduit 27 extends through the wall structure to points of connection to the main electrical system. The partition 25, including the junction box 24, is installed after the covering layer 28 of poured concrete is deposited over the electrical grid 21. The protective tube 29 will normally be placed in position as the covering layer 28 is poured. Following the installation of the cover layer 28 and the partition assembly, carpeting can be installed as indicated at 30, together with appropriate edge moldings 31 and 32. The concrete slab sub-floor 20 can be replaced by the structure shown in FIG. 2, in which the precast concrete double T beams 33 and 34 are laid as shown edge-to-edge so that their to flanges are coplanar to produce the sub-floor surface. The cross-sectional configuration of these beams is standard.

Figure 8:
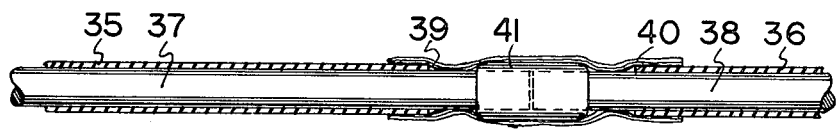
FIG. 8 is a sectional elevation showing a completed coaxial connection between grid elements.
Figure 9:
FIG. 9 illustrates a partially-completed connection prior to the final positioning of the added heat-shrinkable insulating tubes.
Figure 10:
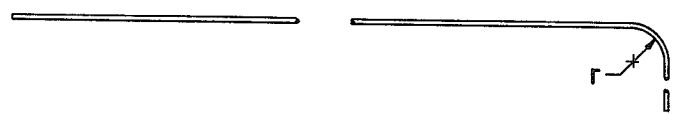
FIGS. 10 through 15 illustrate various forms of prebent electrical resistance elements that can be combined together to produce a grid of the type shown in FIGS. 6 and 7.
Figure 11:
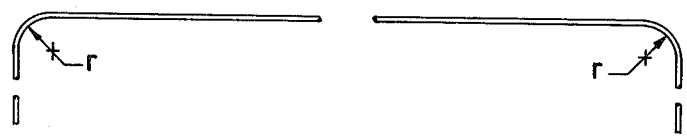
Figure 12:
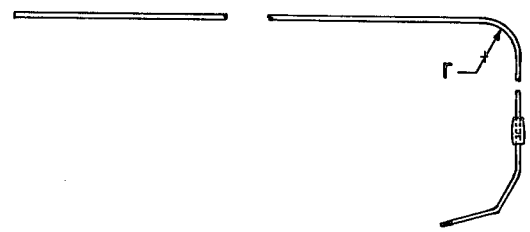
Figure 13:
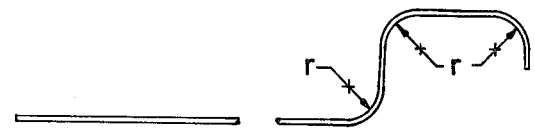
Figures 14, 15:
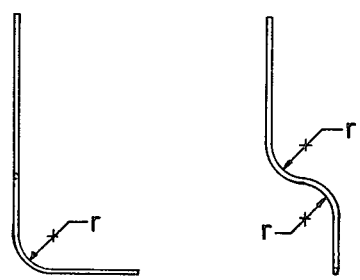

Referring to FIGS. 8 and 9, the junctions between the various resistor elements are formed by bringing the adjacent ends together in coaxial relationship, after stripping off the central insulation indicated at 35 and 36 over the resistance-conductors 37 and 38 back to the positions indicated at 39 and 40, which are sufficiently remote from the junction so that the weld material shown at 41 can be added in the molten state for a short period without damaging the central insulation 35 and 36. The resistor elements can be manufactured with uncovered ends to avoid a separate stripping operation on the site. Prior to the welding at 41, the insulating tubes 42 and 42a are slipped over the resistor 37 and its insulation 35 to positions set back from the junction, as shown in FIG. 9. Preferably two of these tubes are used, the tube 42 being smaller than the tube 43. After the weld 41 has been completed, the tube 42 is slipped over the exposed portions of the conductors 37 and 38, the length of the tube 42 being sufficiently great to overlap the insulation 35 and 36. The tube 42 is then heat-shrunk into position, after which the tube 42a is slipped over the tube 42 as a second layer of insulating material. This is then heat-shrunk into position so that the final insulated joint appears as is illustrated in FIG. 8.

Figure 7:
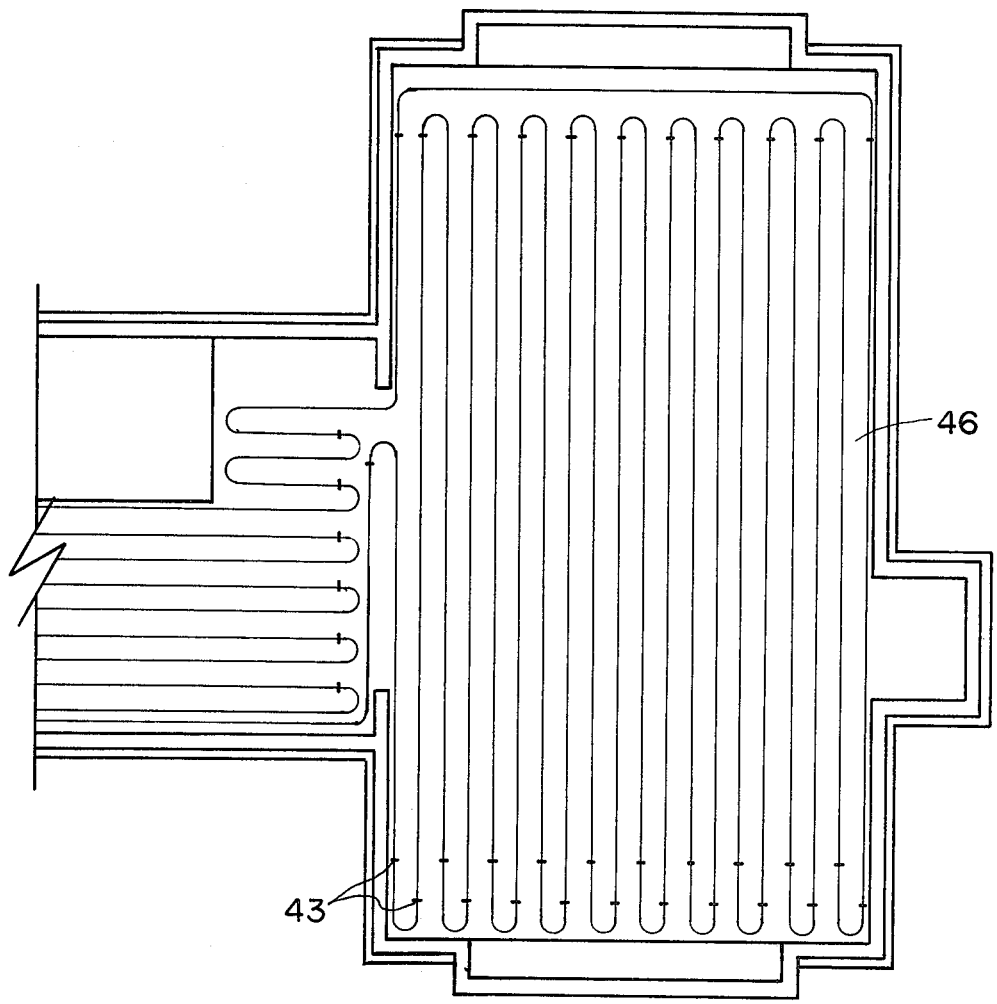
FIG. 7 is a continuation of FIG. 6, showing the extension of the grid into an adjacent connecting room.

Referring to FIGS. 6 and 7, these views may be regarded as a schematic diagram of a single grid system installed in the floor of adjacent rooms. The entire system is made up of components of a type shown in FIGS. 3–5 and 10–15, with connections being made at such points as are indicated at 43. The system terminates in a junction box area indicated at 44, which may be of the type shown in FIG. 1, or may be partially or completely buried in the poured concrete floor structure. It is highly significant that the continuity of the resistor elements across the welded areas produces no significant local change in resistance. Any point of significant resistance increase will produce a hot spot in the system, which is very undersirable. It is usually very convenient to utilize rod material similar to hard-drawn steel rod for the resistance elements, which results in adding to the structural integrity of the floor assembly, even though these elements are surrounded by insulation. The various runs of these resistor-conductors can be placed as close as four inches to each other, or separated to a greater extent to provide a given degree of heat input per square foot of floor area. The spacing of these components can thus account for variations in heat loss between rooms such as are indicated at 45, and that shown at 46, were heating conditions may be significantly different. The presence of windows or other such heating discontinuities is thus easily accommodated. Standard shapes that are pre-formed under factory conditions in configurations illustrated at FIGS. 3–5 and 10–15 facilitate the installation and assembly of the entire system to the point that a given installation can be factory pre-planned, and the comonents selected and packaged for shipment direct to the construction site.

I claim:

1. A method of constructing a floor system incorporating electric resistance heating elements, comprising:
constructing a sub-floor;
placing a grid of interconnected electric resistance elements on said sub-floor, including the placement of connecting portions extending upward from said sub-floor, at least certain of said elements being interconnected by welding and are covered by primary insulation to positions spaced from said welding producing adjacent initially exposed portions, and said welding and adjacent initially exposed portions are covered by separate insulating material, said separate insulating material being a plurality of overlaid heat-shrinkable tubes of different lengths and initially different diameters, the outer of said tubes being longer and extending beyond the ends of the inner of said tubes, and said tubes are slipped over said elements prior to said welding.

* * * * *